United States Patent

Schneider et al.

[11] Patent Number: 6,137,830
[45] Date of Patent: Oct. 24, 2000

[54] MEASURING BIT ERROR RATE PERFORMANCE OF A RECEIVER BY THE RECEIVER AND CONVEYING MEASUREMENT ACOUSTICALLY

[75] Inventors: Robert B. Schneider, Hypoluxo; Efrain Nieto, Boca Raton, both of Fla.

[73] Assignee: Motorola, Schaumburg, Ill.

[21] Appl. No.: 09/008,084

[22] Filed: Jan. 16, 1998

[51] Int. Cl.[7] .................................................. H04B 17/00
[52] U.S. Cl. .......................... 375/224; 375/227; 375/228; 455/156.1; 455/226.1; 455/226.2; 455/226.3; 455/226.4; 702/118; 702/124
[58] Field of Search .................................... 375/222, 224, 375/227, 228; 455/67.4, 115, 226.1, 226.2, 226.3, 226.4, 423, 156.1; 702/103, 118, 123, 124; 704/58, 59, 60

[56] References Cited

U.S. PATENT DOCUMENTS

| | | | |
|---|---|---|---|
| 4,100,531 | 7/1978 | Fletcher et al. | 340/146.1 |
| 4,649,538 | 3/1987 | DeLuca et al. | 371/25 |
| 4,920,537 | 4/1990 | Darling et al. | 371/5.1 |
| 5,233,344 | 8/1993 | Ohga | 340/825.44 |
| 5,233,628 | 8/1993 | Rappaport et al. | 375/10 |
| 5,289,178 | 2/1994 | Schwendeman | 340/825.44 |
| 5,323,421 | 6/1994 | LaRosa et al. | 375/10 |
| 5,448,616 | 9/1995 | Kaewell et al. | 379/5 |
| 5,521,904 | 5/1996 | Eriksson et al. | 370/15 |
| 5,621,737 | 4/1997 | Bucher | 371/5.1 |
| 5,862,467 | 1/1999 | Miyashita | 455/343 |
| 5,943,617 | 8/1999 | Nakamura | 455/423 |
| 5,987,320 | 11/1999 | Bobick | 455/423 |

*Primary Examiner*—Stephen Chin
*Assistant Examiner*—Dac V. Ha

[57] ABSTRACT

A system (100) for measuring bit error rate performance of a radio device by the radio device and conveying measurement acoustically includes a test controller (102), a pattern generator (104), a radio frequency signal generator (106), an audio receiver (108), and a test environment cell (110) containing the radio device under test, or DUT (112), such as a selective call device. The radio device includes a radio frequency receiver (113), a sound generating device (122), a memory (118) having a pre-stored digital pattern, and a microprocessor (120) for decoding a received digital pattern. The microprocessor decodes the received digital pattern, compares the received digital pattern with the pre-stored digital pattern, calculates a bit error rate, and controls the sound generating device to produce an audible signal indicative of the bit error rate. The test controller correlates the bit error rate with a radio frequency sensitivity level.

2 Claims, 2 Drawing Sheets

MEASURING BIT ERROR RATE PERFORMANCE OF A RECEIVER BY THE RECEIVER AND CONVEYING MEASUREMENT ACOUSTICALLY

FIELD OF THE INVENTION

This invention relates in general to radio receivers, and more specifically to a method for testing performance of a receiver by the receiver itself determining a bit error rate of a received signal and then producing an audio signal indicative of the bit error rate.

BACKGROUND OF THE INVENTION

Determining a receiver's ability to receive signals is an important post-manufacturing testing procedure. Measuring the sensitivity of a receiver such as a receiver within a selective call device, or pager, has historically been time consuming. Some prior art methods use a probeless environment simulating an RF field while measuring the selective call receiver's boolean response: an alert tone or no alert tone. Measuring the RF sensitivity of a selective call device by measuring its boolean response requires multiple, time-consuming paging attempts. Measurement accuracy is a function of the number of paging attempts; therefore, high accuracy disadvantageously requires a large number of paging attempts.

Measuring a Bit Error Rate (BER) is another prior art method to determine a selective call device's ability to receive signals. BER testing reduces measurement time and increases repeatability capability over measuring a boolean response. Disadvantageously, prior art methods typically add costly hardware and algorithms to a device under test to enable BER testing. BER testing requires a test controller that generates a multi-bit digital pattern and controls a radio frequency transmitter, and that subsequently receives from the selective call device, usually via wireline, a multi-bit digital pattern decoded by the selective call device. Disadvantageously, the wireline affects the ability of the selective call device to receive a page. The test controller then calculates a BER and stores the result. However, the implementation of BER testing for wireless one-way communication devices with built in antennas needs to be accomplished without probing the device under test, as it could affect the measurement. The main problem to overcome with this constraint is enabling a communication path from the device under test back to the test controller.

Thus what is needed is a selective call device that itself determines a BER of a received signal without using external apparatus and which conveys the BER to the test controller in a manner that does not affect the BER measurement.

DETAILED DESCRIPTION OF A PREFERRED EMBODIMENT

Figure 1:
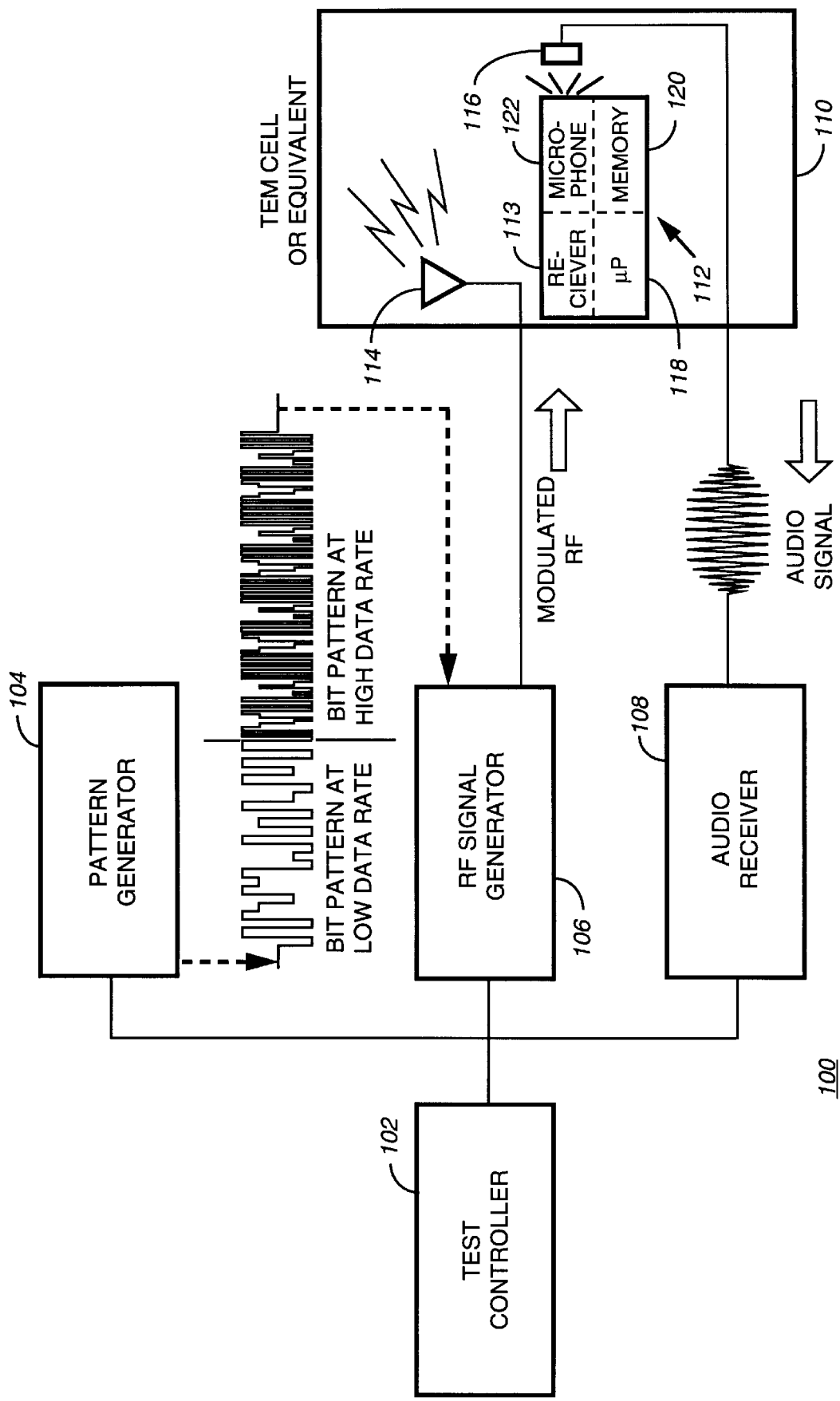
FIG. 1 is a functional block diagram of a test system in accordance with the invention.

Referring now to FIG. 1, there is shown a system 100 including a test controller 102, a pattern generator 104, a radio frequency (RF) signal generator 106, an audio receiver 108 and a radiated RF test environment cell 110. The test controller is electrically connected to the pattern generator, to the RF signal generator and to the audio receiver. The system is used to evaluate the performance of a radio receiver of a Device Under Test, or DUT 112, such as a selective call device. The system 100 indirectly determines a RF sensitivity level of a wireless receiver within a DUT 112 more quickly and with greater repeatability than testing RF sensitivity directly. The test controller can be a general purpose personal computer or work station programmed to operate the pattern generator 104, the RF signal generator 106 and the audio receiver 108. The pattern generator produces multi-bit digital patterns, including a synchronization pattern and a pattern representative of a message of a radio frequency paging protocol, such as the popular FLEX™ paging protocol. The synchronization signal is typically at a relatively low data rate such as 1600 bits per second, and the message pattern is typically at a relatively high data rate such as 6400 bits per second. The RF signal generator 106 typically produces a frequency modulated (FM) signal at a typical paging frequency in the very high frequency or ultra high frequency bands. The FM signal carries the multi-bit digital pattern produced by the pattern generator 104. The radio frequency output of the RF signal generator is electrically connected, preferably by a coaxial cable, to an antenna 114 fixed within the test environment cell 110. The test environment cell is an enclosure that acts as a barrier to electromagnetic radiation at the operating radio frequency of the device under test, or DUT 112, such that the device under test receives signals only from the antenna 114.

The DUT 112, includes a radio frequency receiver 113, a memory 118, including a random access memory, or RAM, for pre-storing a multi-bit digital test pattern, or stored test pattern, and a read-only memory, or ROM, for storing programming instructions, and a microprocessor 120. The microprocessor 120 is used to both decode a received multi-bit digital test pattern and to advantageously also determine a bit error rate. As is well known to those skilled in the art, a decoder may incorrectly decode one or more bits of a multi-bit digital pattern under low signal strength conditions. Therefore, the system 100 is used to test a device, such as a selective call device, under relatively low signal strength conditions at or near a signal strength level where there is a reasonable likelihood that one or more bits of the received test pattern will be decoded erroneously. After decoding the received test pattern in a manner well known to those skilled in the art, the microprocessor 120 determines the bit error rate (BER) of the received test pattern by comparing the received test pattern with a stored test pattern stored in the memory 118. Unlike some prior art methods and apparatus that use a microprocessor apart from the DUT to calculate a bit error rate, the system 100 in accordance with the invention advantageously uses the microprocessor 120 within the DUT 112 to calculate the bit error rate, thereby eliminating a need for a second microprocessor, and thereby also eliminating a need to convey the received test pattern from the DUT to the second microprocessor.

The DUT also includes a sound generating device 122 similar to the sound generating device typically found on conventional selective call devices. The system 100 includes a microphone 116 located within the test enclosure cell (but distant from the DUT 112 so as not to interfere with the reception of radio signals by the DUT) for detecting sound emitted from the DUT. The microphone 116 is connected, preferably by a cable, to an input of the audio receiver 108 that is preferably located outside the test environment cell 110. Also, prior to the commencement of the BER test, a plurality of categories of bit error rates are pre-stored in the memory 118 of the DUT 112, where each category, or bin, corresponds to a range of bit error rates. Preferably, there are twenty-one bins. After calculating the bit error rate of a received and decoded test pattern, the microprocessor 120 determines one category of the plurality of categories of bit error rates to which the calculated bit error rate belongs. Then, the microprocessor 120 of the DUT 112 controls the sound generating device such that the sound generating device 122 that transmits an acoustic signal indicative of the calculated bit error rate. The DUT incorporates known synchronizing and test patterns into its permanent memory, or ROM. The DUT 112 also incorporates the software needed to store a received pattern, compare a received pattern against the stored pattern, calculate the difference (or bit error rate) between the patterns, and emit an audible alert tone which correlates to the calculated bit error rate. The DUT 112 performs an auto-correlation function on the sent data and the received data to restore synchronization. Once synchronization is accomplished, data error analysis is straight forward. Conventional, prior art BER analysis provides only limited data on the overall receiver performance. An output of the audio receiver 108 is electrically connected, preferably via wire, to an input of the test controller 102. The test controller 102 receives an alert duration measurement from the audio receiver 108, and the test controller determines therefrom the RF sensitivity level of the DUT 112. It should be understood that the test controller is preprogrammed with data, previously heuristically obtained, that correlates BER categories, or bins, with RF sensitivity levels.

Figure 2:
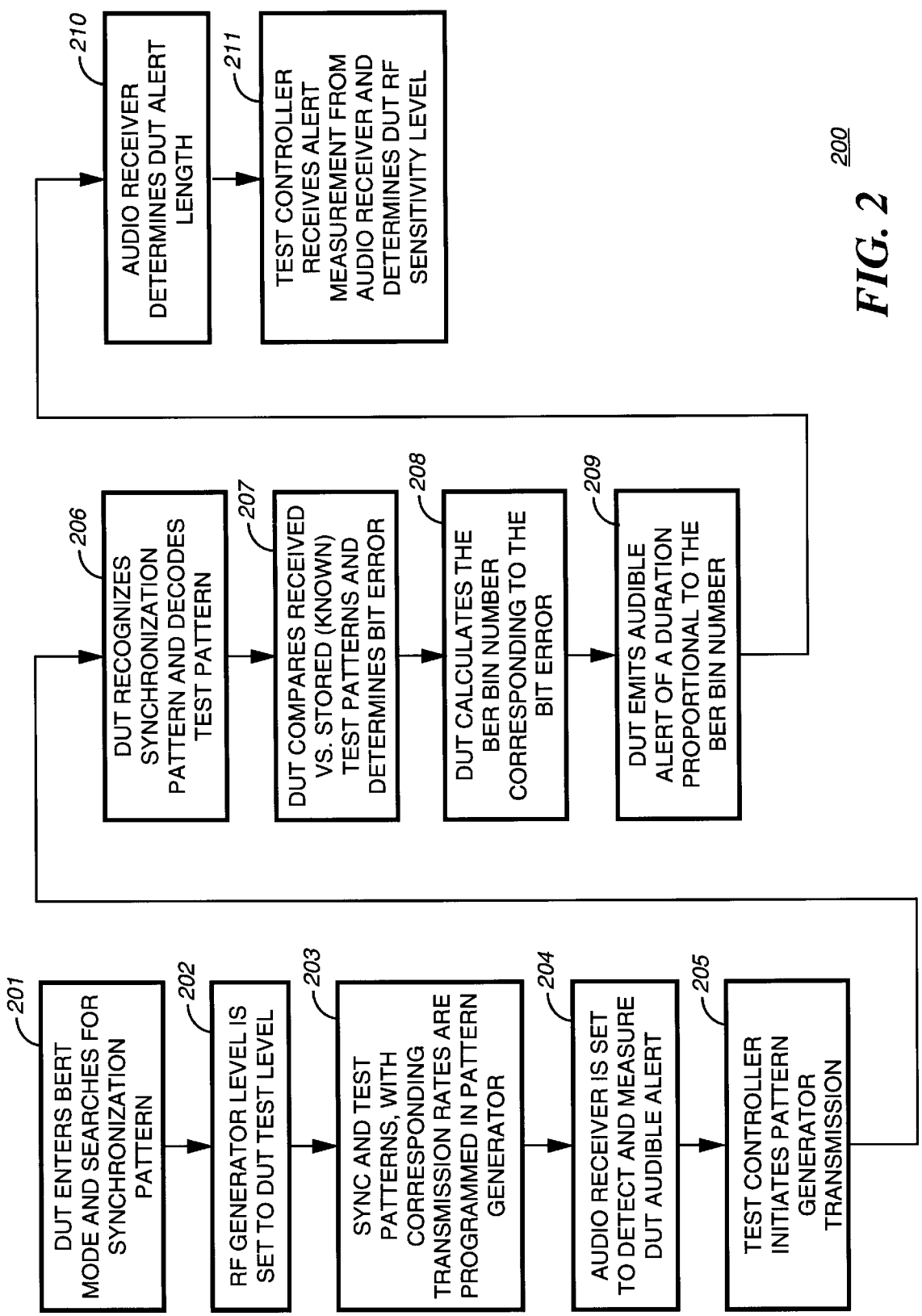
FIG. 2 is a flow diagram of a method in accordance with the invention.

Referring now to FIG. 2, there is shown a flow diagram 200 of a method in accordance with the invention. It should be understood that a multi-bit digital pattern, or test pattern, is pre-stored in a memory of the device under test, or DUT 112, in accordance with the invention. Also, when the device under test is a selective call device, it is pre-programmed to operate under one of the paging protocols, such as the FLEX™ paging protocol. At step 201, the DUT 112, which is located within a test environment cell 110, is placed into a bit error rate test (BERT) mode, and the device electronically searches for a synchronization pattern within a signal received wirelessly. The DUT is placed into BER test mode via a user button sequence on the DUT, or wirelessly over the RF channel, or by any other method. In BER test mode, the DUT continually monitors the RF channel for the synchronization pattern. The signal is radiated from the antenna 114, also located within the test environment cell. At step 202, the RF signal generator level is set to a relatively low test level so as to encourage possible bit errors. The test controller 102 sets the RF signal generator level to produce a field strength stimulus appropriate for the test. Typically, the RF level is set to the pass/fail specification of the DUT 112. At step 203, the synchronization pattern and the test pattern are programmed into the pattern generator 104. As shown in FIG. 1, the synchronization pattern has a relatively low transmission rate, and the test pattern has a relatively high transmission rate. Referring again to FIG. 2, at step 204, the audio receiver 108 is set to detect and measure the audible alert emitted from the DUT 112. At step 205, the test controller programs the pattern generator with the synchronizing and the test patterns. The test controller 102 then initiates transmission of the synchronization and test patterns. The synchronization pattern is sent at a low data rate, immediately, followed by the test pattern sent at a higher data rate. Using the different data rates for the synchronizing pattern and the test pattern enables independent control of the bit error rates of the two patterns. Thus, robust synchronization can be achieved while testing at high bit error rate levels. At step 206, the DUT recognizes the synchronization pattern and the DUT decodes the test pattern. Upon detecting the synchronization pattern, the DUT is able to receive the immediately following test pattern with timing integrity. The test pattern is then compared to the stored pattern for bit errors. These errors are primarily a function of receiver sensitivity rather than synchronization errors. At step 207, the DUT compares the received, decoded test pattern with the stored test pattern, and calculates therefrom, a calculated bit error rate. At step 208, the DUT determines the category, or bin number, of the calculated bit error rate. At step 209, the DUT emits an audible alert having a duration representative of the category, or bin, of the calculated bit error rate. Preferably, the larger bin numbers correspond to larger bit error rates. Only after the entire test pattern is received, the DUT emits an audible alert that has a duration proportional to BER. Time diversification is used to eliminate possible DUT desense due to generating audio tones during RF sensitivity testing. The test controller 102 uses the audio measurement device to determine the alert tone length. Bit error rate correlates to tone length based on the predetermined function programmed into the DUT. This function can be linear or logarithmic, based on the measurement range and resolution required for the test. Preferably, the duration is directly, linearly proportional to the bin number. At step 210, the audio receiver 108 detects the alert and determines the alert length. The audio measurement can be accomplished with any of a variety of instrumentation. At step 211, the test controller 102 receives the alert duration measurement from the audio receiver 108, and the test controller 102 determines therefrom the RF sensitivity level of the DUT 112. The method in accordance with the invention could also be recursively applied using the previous BER measurement to adjust the RF field to extend range and resolution.

Although the invention has been described in terms of a preferred embodiment, it will be obvious to those skilled in the art that many alterations and variations may be made without departing from the invention. Accordingly, it is intended that all such alterations and variations be considered as within the spirit and scope of the invention as defined by the appended claims.

We claim:

1. A system for measuring bit error rate performance of a receiver by the receiver and conveying measurement acoustically, comprising:

a test controller electrically coupled to a pattern generator, to a radio frequency signal generator, and to an audio receiver; and a test environment cell, including,
   an antenna electrically coupled to the radio frequency signal generator,
   a selective call device positioned within the test environment cell, and
   a microphone electrically coupled to the audio receiver.

2. A method of determining sensitivity of a receiver of a selective call device comprising, the steps of, at the selective call device:

storing a test pattern in the selective call device;

storing a plurality of categories of bit error rates, each category corresponding to a pre-determined range of bit error rates;

receiving a radio frequency signal carrying the test pattern;

decoding the test pattern to produce a received test pattern;

determining a calculated bit error rate of the received test pattern;

determining one category of the plurality of categories of bit error rates, the one category corresponding to the calculated bit error rate; and emitting an audible alert associated with the one category corresponding to the calculated bit error rate; and, at a remotely located test controller, storing a pre-determined relationship between receiver sensitivity and category of calculated bit error rate; and wirelessly receiving the audible alert.

* * * * *